UNITED STATES PATENT OFFICE.

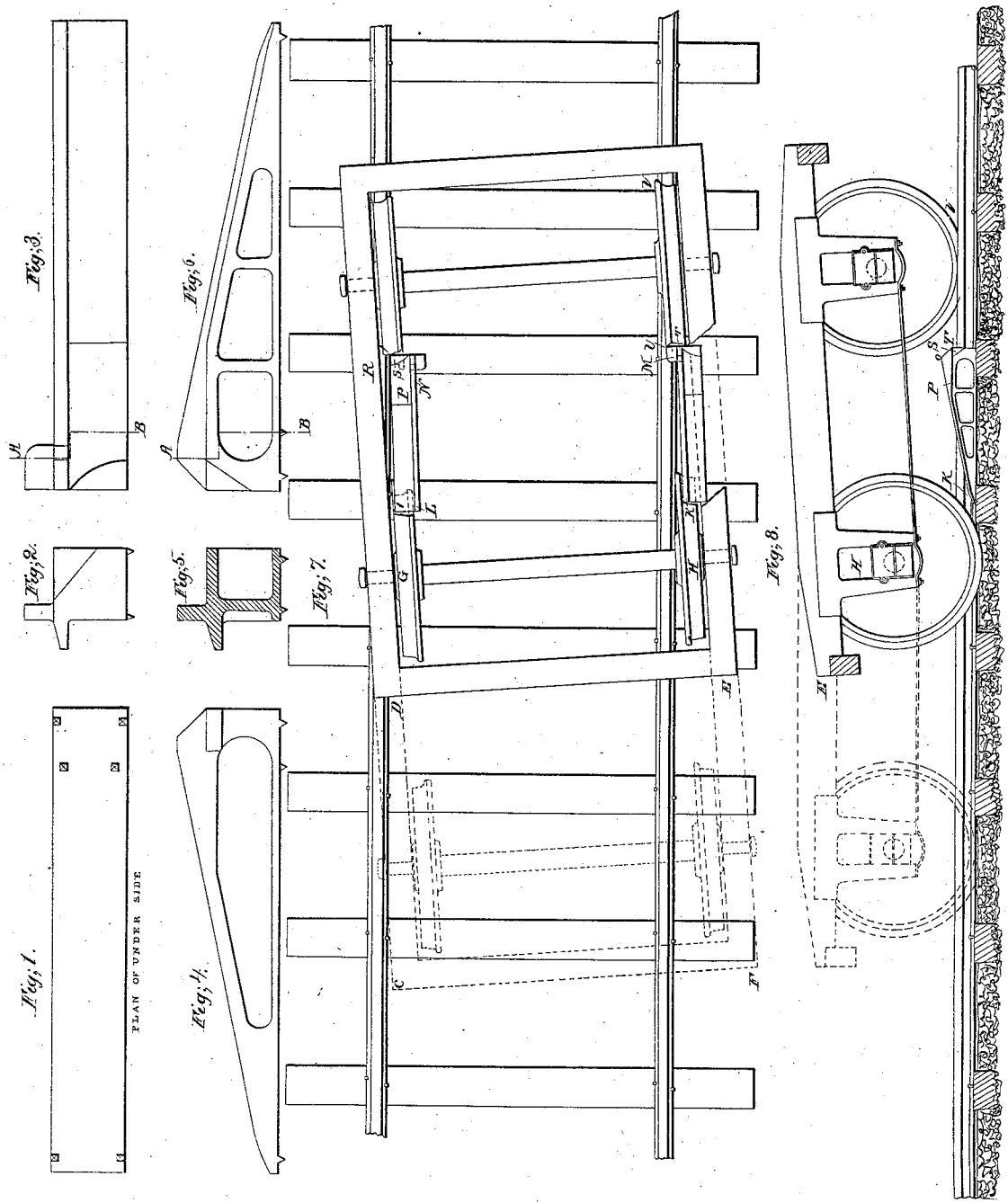

JOSEPH D. POTTS, OF PITTSBURG, PENNSYLVANIA.

IMPROVEMENT IN RETRACKERS FOR RAILROAD-CARS.

Specification forming part of Letters Patent No. 33,795, dated November 26, 1861.

*To all whom it may concern:*

Be it known that I, JOSEPH D. POTTS, of Pittsburg, in the county of Allegheny, in the State of Pennsylvania, have invented a new and Improved Mode for Replacing the Wheels of Railroad Cars or Engines Upon Their Tracks, being an adjustable track, which I call a "Retracker;" and I do hereby declare that the following is a full and exact description thereof, reference being had to the accompanying drawings, and to the letters of reference marked thereon.

The design of this invention is the replacing of the wheels of railroad cars or engines upon their tracks from which they may have been displaced by accident or otherwise. Its operations are twofold: first, the raising of the wheels to such proper elevation as to permit the passage of the flange of the wheel lying entirely outside the track over its rail, and the raising of the wheel lying between the rails to such proper elevation as may be necessary to place the tread of the wheel upon its rail, and, second, after the above-described "elevations" have been accomplished, to "draw" or "crowd" the wheels into their proper positions on the track by employing the gravitating force or "weight" of the wheels with their superincumbent car or engine, directed by one of the "inclines" specially devised for that purpose.

In the drawings, Figures 1 to 6, inclusive, are detail views of the retracker, showing the peculiarities of its form and construction. Fig. 1 is the view of its under surface, showing the position of the "points" or "studs," which by entering the cross-ties hold it in position. Fig. 2 is its end view at the higher end. Fig. 3 is its ground plan as its lies in position for use. Figs. 4 and 6 are its side views. Fig. 5 is its cross-section on the line A B. The above details are drawn to a scale of three inches per one foot, or one-fourth the natural size. Figs. 7 and 8 are a ground plan and elevation of a displaced railroad-truck, showing the mode of operating with the retracker to replace the same.

The portion of the truck-frame and wheels drawn in dotted lines C D E F, together with the pair of wheels G H, represents the position of a truck off the track, G H being the forward wheels. A pair of retrackers are placed upon the cross-ties in position to the wheels, as shown at I K, and by a tap of a "bar" or hammer the points on the under surface are forced slightly into the cross-ties on which they rest. Portions of the wheels and truck-frame are shown in the drawings as broken or removed in order to exhibit more perfectly the position of the retrackers. The truck is then drawn forward, and the following action takes place. The points of the retracker are by the weight of the truck and its superincumbent load sunk deeply into the cross-ties, and the retracker is thus firmly secured in the desired position. The "flange" of the wheel G passes onto the "tread" of the retracker at I, while the tread of the wheel H passes onto the flange of the retracker at K, and both wheels commence to ascend the respective inclines of the retrackers, the direction of their motion being guided by their flanges acting, respectively, against the flanges of the retrackers L N and K O. The wheels having advanced up and attained the summits of the two inclines, the wheel H, being then upon the summit of the retracker at O, is raised sufficiently high to admit of the passage of its flange over the surface of the rail at M, the lip M preventing the possibility of the wheel H dropping down between the rail and the retracker. The wheel G at the same time is on the "level" of the retracker P, and upon advancing farther forward its flange begins to full into the curved incline S, and by the weight or gravity of the wheels and their superincumbent load is forced to slide down the incline S in the direction of the arrow, thereby crowding or drawing the wheel toward and at the same time lowering it down into its proper position upon the rail, as at R. By the connection of the axle the wheel H is of course drawn over at the same time, and rolling down the incline O T its flange is lowered onto the rail, as at U, over which it passes until it drops into its proper position, as at V. The forward wheels being now replaced upon the track, the rear (or dotted) wheels have advanced into the position of the wheels G and H and the process, as above described, is repeated with them. By shifting the retrackers to the sides of the rails opposite to those on which they are placed in the drawings, it is plain they will then be in position to replace a truck whose wheels are off the track on the same sides of the rails on which the retrackers would be then situated. Turning the retrackers end for end and changing them to the opposite rails, they will then be in position to replace a truck moving in a reverse direction to that given in the drawings. When the truck is replaced on the track, the retrackers can be readily loosened from their hold on the cross-ties by a tap of a bar.

A "right" and "left" retracker constitute a "set." One set should accompany each locomotive-engine.

Figs. 7 and 8 are drawn to a scale of one inch per foot or one-twelfth the natural size.

My claim is for the following points:

1. The construction of the adjustable track or retracker, inclined and resting on and secured to a horizontal base, substantially as herein described, to operate in the manner and for the purposes set forth.

2. The device of points on the under side of this base, whereby the track can be secured in any position desired by forcing said points into the ties or other wooden support of the rails, either by bringing on the adjustable track the weight of the car or engine to be put on or by other means.

3. In retrackers constructed substantially as herein described, the combination of inclines and bevels, whereby when the wheels are brought thereon they are so moved that the wheel lying entirely outside the rails has its flange first lifted above the rail of the road and then gradually lowered so that it touches said rail, and that the wheel lying between the rails has its tread raised above the rail of the road and then gradually lowered onto said rail and by the action of its own gravity, guided by the incline, is forced toward said rail, thus bringing its own and the tread of the opposite wheel into their proper positions on the track and placing the two wheels as nearly simultaneously as possible on their proper rails.

4. The arrangement whereby the flanges of the wheels are guided by coming against the sides of the retrackers to the track on which they are to be placed.

5. The lip which by projecting over the rail of the road prevents the flange of the wheel from going between said rail and the adjustable track.

6. The arrangement whereby each of the two adjustable tracks constituting a set is arranged so that it can be used for either wheels between the rails or outside of the rails, as is required.

7. The devices whereby the incline and base are united, as shown in the drawings.

JOS. D. POTTS.

Witnesses:
WALTER KATTÉ,
A. S. RUSSELL.